May 26, 1970     W. H. SCHWARTZ ET AL     3,513,999
LIFTING AND CARRYING VEHICLE
Filed March 27, 1968     4 Sheets-Sheet 1
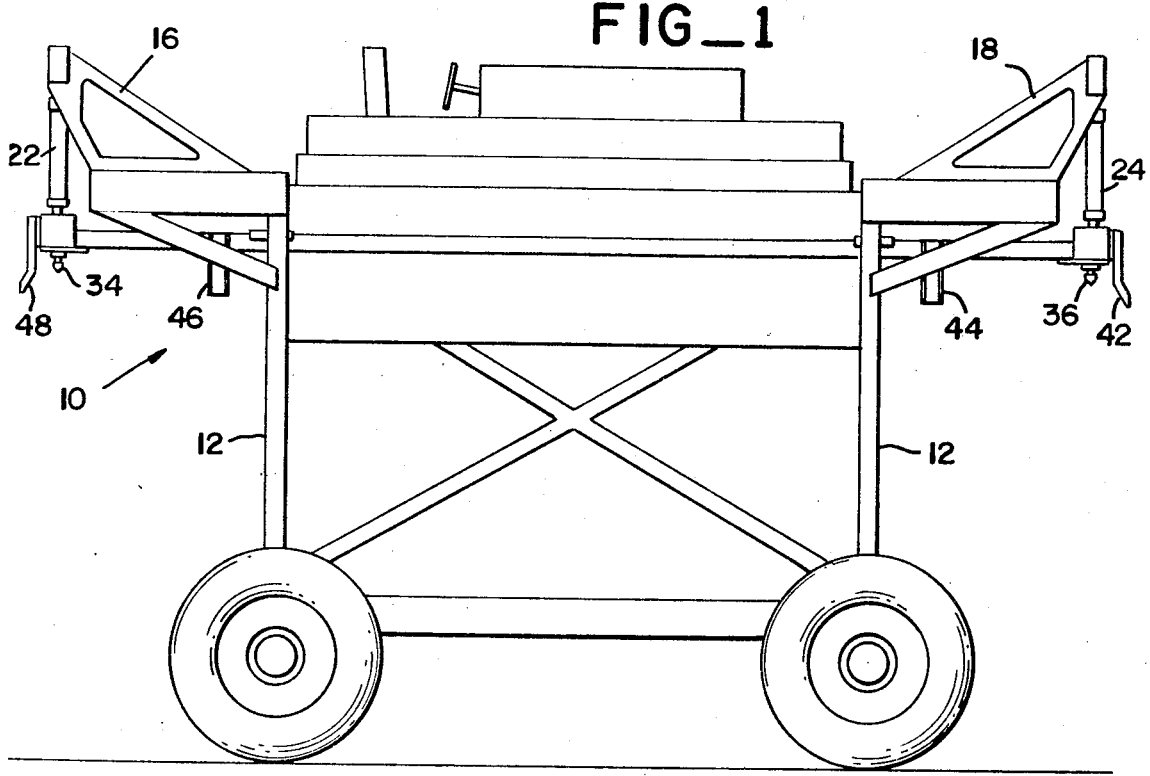
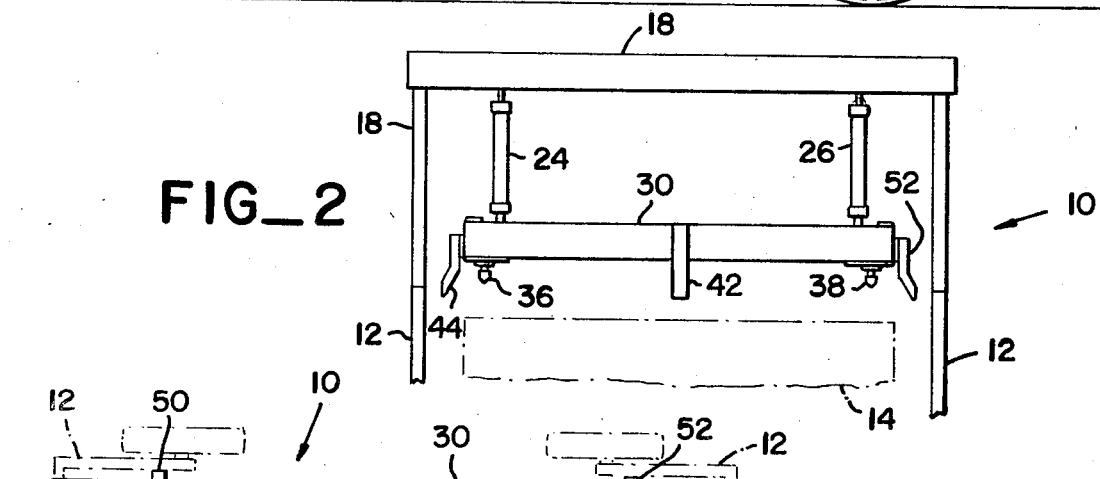
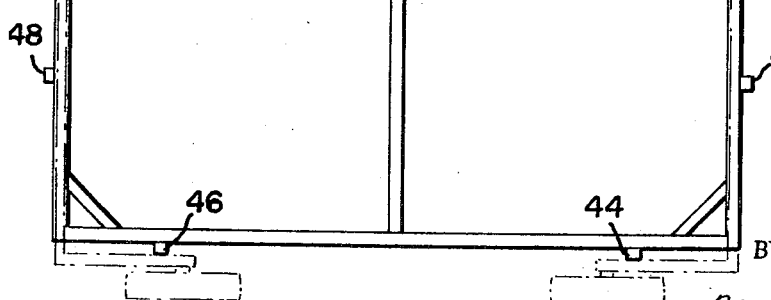
INVENTORS
WILLIAM H. SCHWARTZ
GRAHAM SLATER
BY
*Mellin, Moore & Weissenberger*
ATTORNEYS

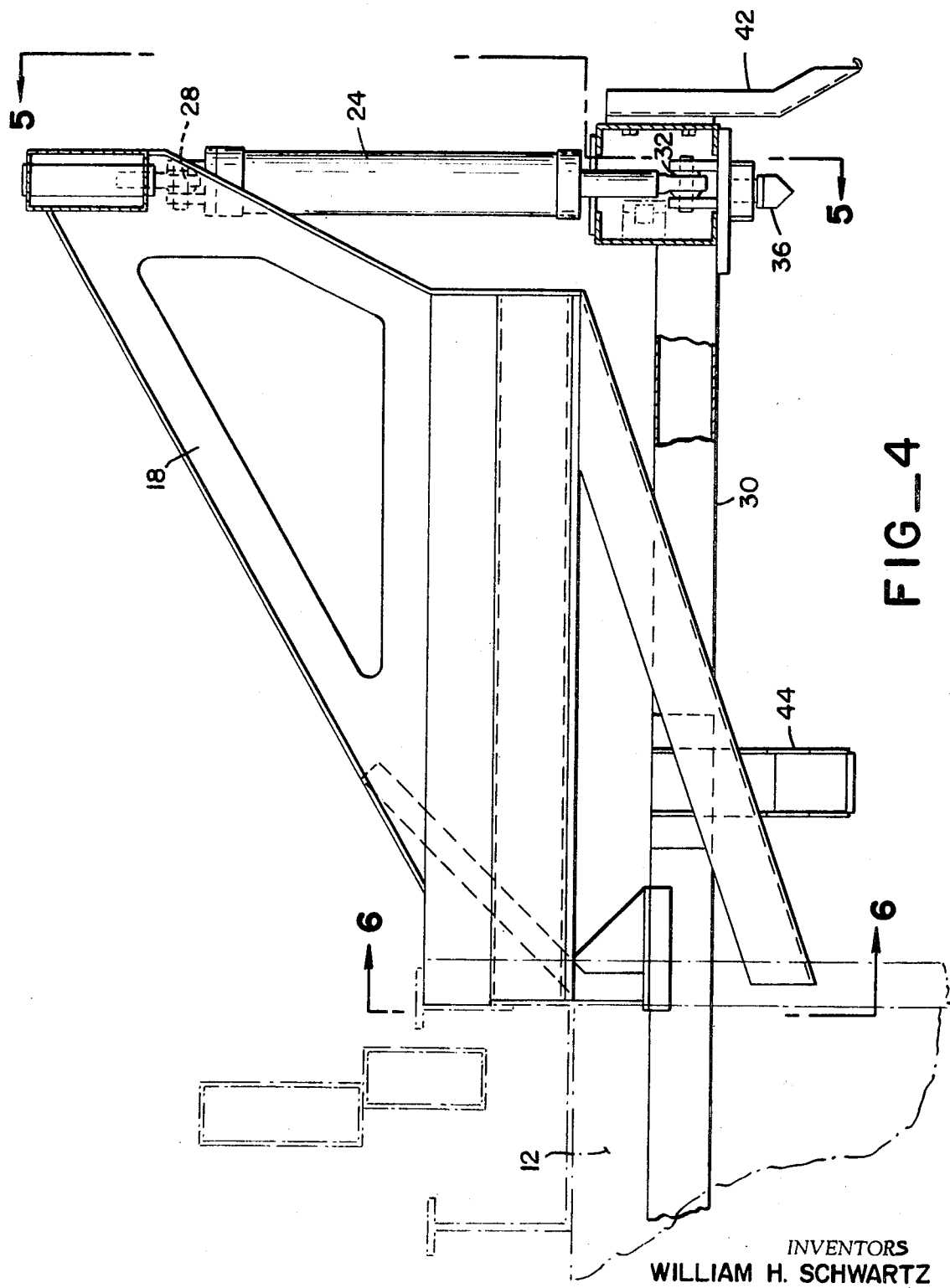

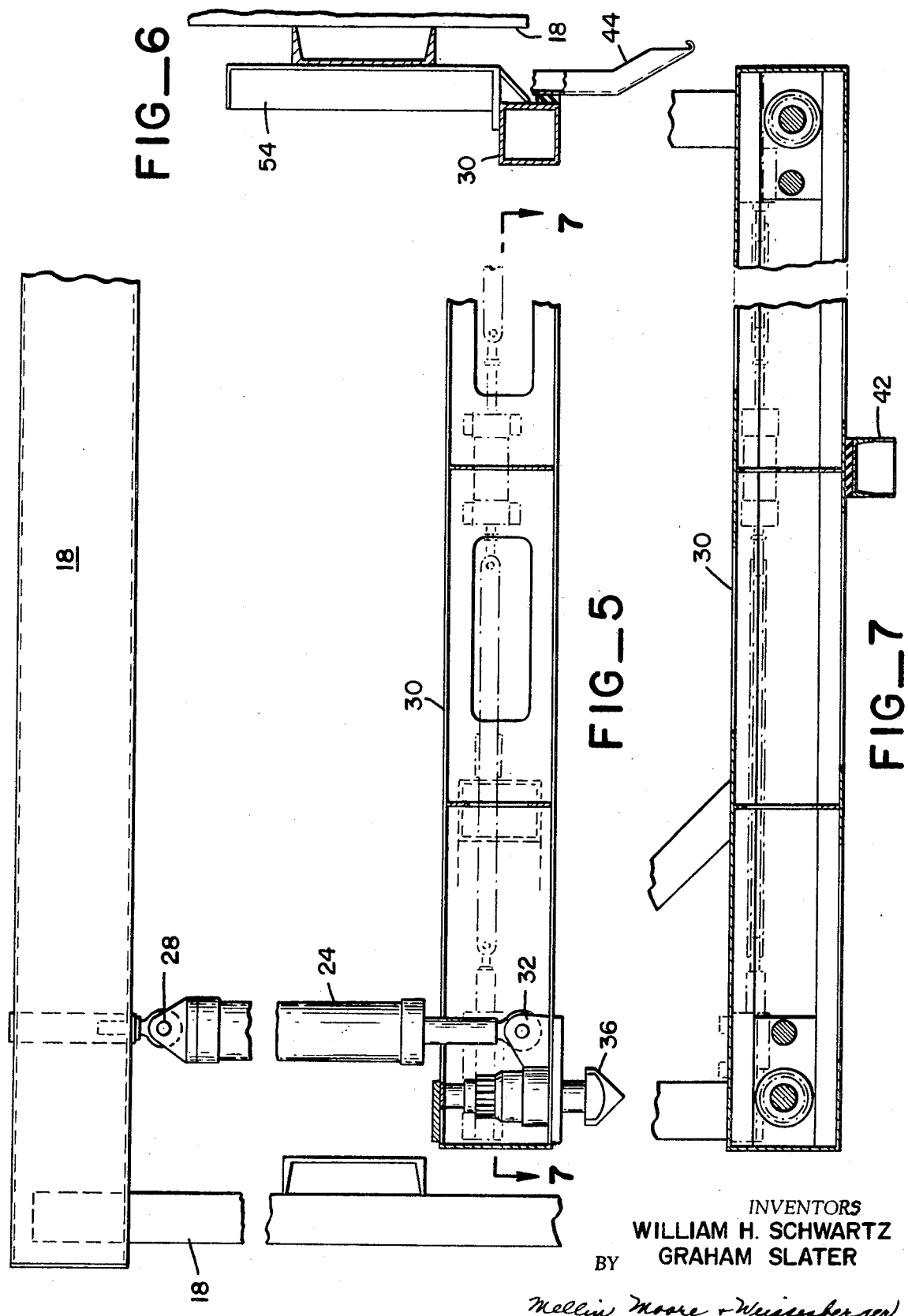

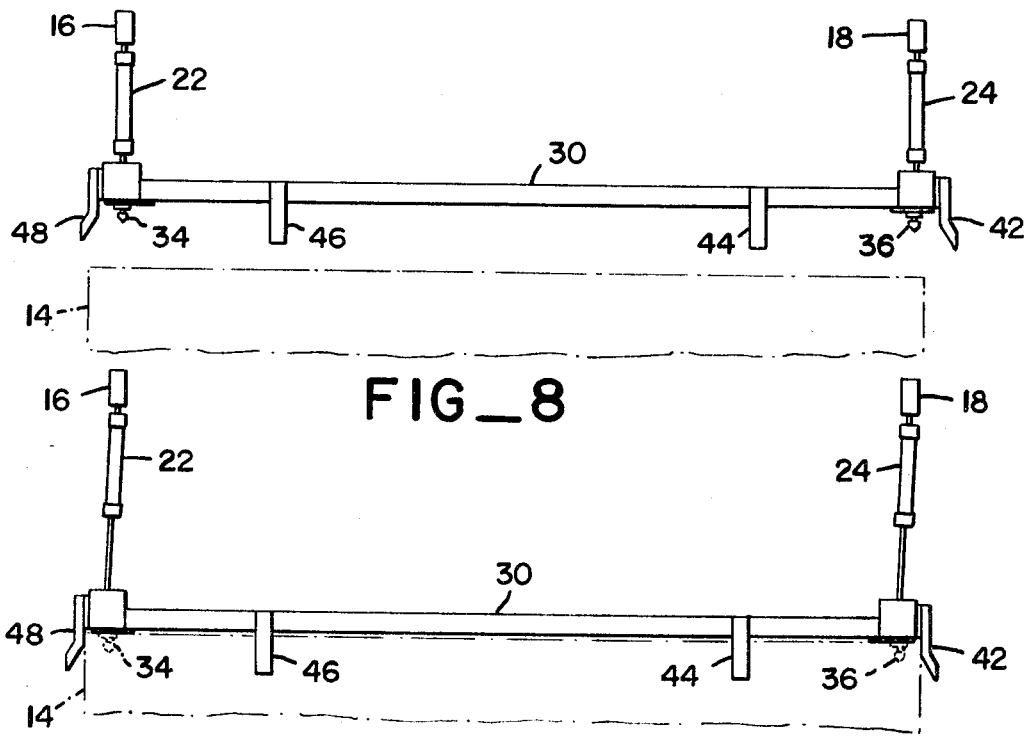
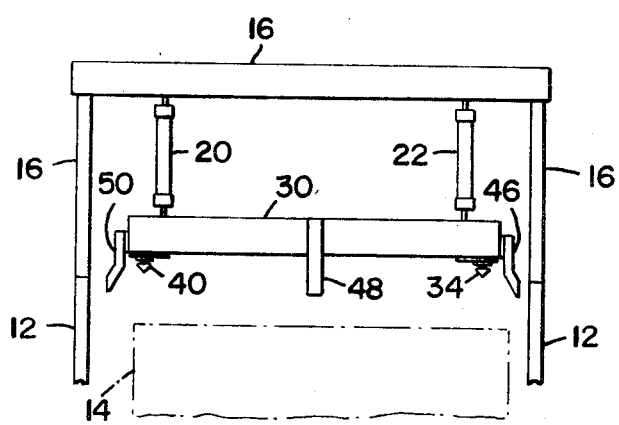
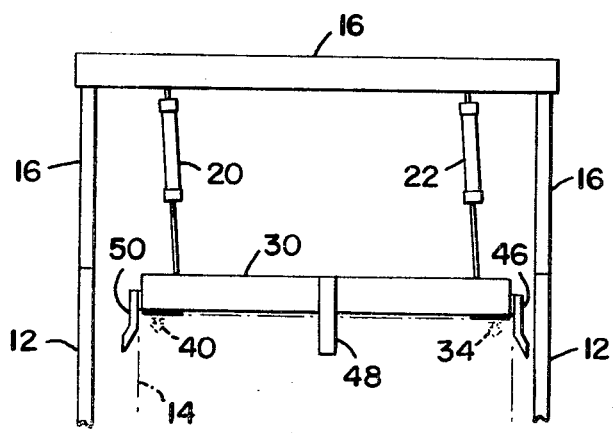

United States Patent Office 3,513,999
Patented May 26, 1970

3,513,999
LIFTING AND CARRYING VEHICLE
William H. Schwartz, 260 Summit Drive, Corte Madera, Calif. 94925, and Graham Slater, 500 Pine St., Sausalito, Calif. 94965
Filed Mar. 27, 1968, Ser. No. 716,399
Int. Cl. B66f 7/16
U.S. Cl. 214—394     1 Claim

ABSTRACT OF THE DISCLOSURE

A vehicle for picking up and transporting containers, the vehicle having a spreader which has fixed thereto a plurality of downwardly and outwardly extending members, the members contacting the container to shift the position of the spreader relative to the container as it is lowered into a proper position so that the spreader and container may be locked together.

BACKGROUND OF THE INVENTION

This invention relates to carriers, and, more particularly, to a carrier which is adapted to pick up and transport containers.

In many situations, it is necessary to pick up and carry a large container which is one of a series of containers quite similar in configuration. In order to carry such standard size containers economically, it has been found desirable to construct a vehicle which is specially adapted to be used with such a standard size container. Such a vehicle generally has a frame which is of inverted, substantially U-shaped cross-section, so that it may be driven to a position straddling the container. The vehicle generally also has a rectangular spreader above the container which can be raised and lowered relative to the frame of the vehicle, and locking means at each corner of the spreader which are adapted to lock each corner of the rectangular top of the container when the spreader and container are properly positioned relative to each other.

Such necessity of proper positioning of the spreader and container has created problems in the past, since the locks generally used are of the type that there is generally allowed very little margin for error of positioning. That is, locking will be impossible unless the spreader and container are positioned quite accurately relative to each other. This generally means that the vehicle, carrying the spreader, must be jockeyed about into proper position, obviously a time-consuming operation.

It is an object of this invention to provide a carrier having a spreader which is capable of being raised and lowered and locked to a container so that the container may be picked up and carried by the vehicle.

It is a further object of this invention to provide a carrier which need not be positioned with such accuracy relative to the container as previously necessary, meanwhile fulfilling the above object.

SUMMARY OF THE INVENTION

Broadly stated, applicant's vehicle for lifting and carrying a container comprises a frame of inverted, substantially U-shaped cross section adapted to straddle the container. A spreader is supported by the frame above the container and is omnidirectionally movable generally coplanar with itself relative to the frame. Means are included for lowering the spreader toward the container. Means are included for attaching the spreader to the container when the spreader is properly position relative to the container. Means are included for guiding the spreader into said proper position relative to the container as the spreader is lowered toward the container. Means are included for lifting the spreader and container therewith after attachment thereto so that the container may be carried by the vehicle.

BRIEF DESCRIPTION OF THE DRAWINGS

These and other objects of the invention will become apparent from a study of the following description and drawings, in which:

FIG. 1 is a side elevation of the lifting and carrying vehicle;
FIG. 2 is an end elevation of a portion of the vehicle;
FIG. 3 is a plan view of the vehicle showing the spreader thereof;
FIG. 4 is an enlarged view of a portion of the structure of FIG. 1 with portions broken away;
FIG. 5 is a view taken along the line 5—5 of FIG. 4;
FIG. 6 is a view taken along the line 6—6 of FIG. 4;
FIG. 7 is a view taken along the line 7—7 of FIG. 5;
FIG. 8 is a side elevation of the spreader and container before the spreader has been lowered;
FIG. 9 is a side elevation of the spreader and container after the spreader has been lowered;
FIG. 10 is an end elevation of the spreader and container before the spreader has been lowered; and
FIG. 11 is an end elevation of the spreader and container after the spreader has been lowered.

DESCRIPTION OF THE PREFERRED EMBODIMENT

A vehicle 10, having a frame 12 of inverted, substantially U-shaped cross section, is shown generally in FIGS. 1 and 2. The frame 12 is adapted to straddle a container 14. The vehicle 10 has end frames 16 and 18 fixed to and extending from frame 12. One end frame 18 and accompanying structure, is shown in detail in FIG. 4. Extending downward from opposite corners of end frame 16 are a pair of cylinders 20, 22. Extending downward from opposite corners of end frame 18 are a similar pair of cylinders 24, 26.

Cylinder 24 is mounted to end frame 18 by means shown in FIGS. 4 and 5. As seen thereon, a ball-and-socket joint 28 joins the cylinder 24 to the end frame 18. Thus the cylinder 24 is omnidirectionally pivotal relative to the end frame 18 (and vehicle 10) to a certain degree. Cylinder 26 is mounted to end frame 18 in the same manner. Cylinders 20, 22 are mounted to end frame 16 similarly. Thus each cylinder 20, 22, 24, 26 is omnidirectionally pivotal relative to vehicle 10.

The bottom end of the cylinder 24 supports a corner of a rectangular spreader 30 by means shown in FIGS. 4 and 5. The connection is made by means of a ball-and-socket joint 32 similar to that at 28. The other cylinders 20, 22, 26 are each connected to a corner of the rectangular spreader 30 in a similar manner. It will be seen that because of the use of such ball-and-socket joints, the spreader 30 is omnidirectionally movable generally coplanar with itself relative to frame 12, and to vehicle 10.

The spreader 30 is supported by the frame 12 above the container 14 when the frame 12 straddles the container 14. The cylinders 20, 22, 24, 26 may be actuated to raise and lower the spreader 30.

It will be noted that the container 14 may be of a standard size, and have a rectangular top portion above which the spreader 30 is disposed when the frame 12 straddles the container 14. The spreader 30 has locking members 34, 36, 38, 40 at its corners. These locking members are of the well-known type which are adapted to fit into apertures and then be turned through 90° for locking. The rectangular top of the container 14 has provided thereon four such holes (not shown) at its corners, into which such locking members are receivable when the locking members are properly positioned relative thereto. Thus, when the spreader 30 and container 14 are positioned properly relative to each other, the locking members may be fitted into the proper holes, and, by turning each locking member 90°, the container 14 may be locked to the spreader 30.

Fixed to the spreader 30 about its rectangular edge are angled guides 42, 44, 46, 48, 50, 52 which flare outwardly and downwardly from the spreader 30. These guides serve to position the spreader 30 relative to the container 14 so that locking therebetween can take place.

In order for such positioning to take place, the vehicle 10 is driven over the container 14 so that its frame 12 straddles the container 14. Obviously, it would be quite difficult to position the vehicle 10 accurately enough so that the locks 34, 36, 38, 40 line up with the holes. In this invention, the spreader 30 is lowered slowly by means of the cylinders 20, 22, 24, 26 when the spreader is approximately over the rectangular top of the container 14. Depending on the relative positions of the spreader 30 and container 14, certain of the guides 42, 44, 46, 48, 50, 52 will contact the container 14 and shift the spreader 30 into proper position so that the locking members 34, 36, 38, 40 line up with the respective apertures. The ball-and-socket mountings of the cylinders 20, 22, 24, 26 allow such shifting of the spreader 30. This shifting is shown in FIGS. 8-11. In FIG. 8, the spreader 30 is above the container and slightly to the right of it. As the spreader 30 is lowered, angled guide 48 contacts the container 14 and shifts the spreader 30 into proper position for locking, as at FIG. 9. In FIG. 10, the container is slightly off the longitudinal axis of the vehicle 10. As the spreader 30 is lowered, angled guide 46 (and 44, not shown in FIGS. 10 and 11) contacts the container 14 and shifts the spreader 30 into proper position for locking, as at FIG. 11. It will be seen, of course, that the other angled guides function in a similar manner, depending on the relative positions of the spreader 30 and container 14.

With the spreader 30 in proper position relative to container 14, each locking member 34, 36, 38, 40 may be turned by well-known means through 90° to lock the spreader 30 to the container 14. The cylinders 20, 22, 24, 26 are then actuated to lift the spreader 30 and container 14 off the ground, so that the container 14 can be carried by the vehicle 10.

As shown in FIG. 6, member 54, fixed to end frame 18, limits the upward movement of spreader 30, and serves to locate it and container 14 when they are raised. Other members (not shown) similar to member 54 are fixed in proper position to end frames 16 and 18 so that the spreader 30 and container 14 are properly located while the container 14 is being carried.

It will be seen that herein is provided a vehicle having a spreader which is capable of being raised and lowered and locked to a container so that the container may be picked up and carried by the vehicle. Furthermore, the vehicle need not be positioned with great accuracy relative to the container, since means are provided for shifting the position of the spreader relative to the container so that proper attachment thereto can take place.

Obviously, the invention can be carried out in many ways, of which the preferred embodiment is merely illustrative. Therefore, we do not wish to be limited to that embodiment, but only by the scope of the following claim.

We claim:

1. A vehicle for lifting and carrying a container having a substantially rectangular top combining:
    (a) a frame of inverted, substantially U-shaped cross section adapted to straddle a container;
    (b) a substantially rectangular spreader within the frame and above the container;
    (c) four hydraulic cylinders, each one located at a corner of the rectangular spreader and depending from an overhead portion of the U-shaped frame to the spreader;
    (d) first ball-and-socket joint means joining one end of each hydraulic cylinder to the frame;
    (e) second ball-and-socket joint means joining the other end of each hydraulic cylinder to the spreader, whereby the spreader is omnidirectionally movable generally coplanar with itself relative to the frame;
    (f) means for actuating the hydraulic cylinders to lower the spreader toward the rectangular top of the container;
    (g) locking means at each corner of the spreader, adapted to lock to each corner of the rectangular top portion of the container when the spreader is properly positioned relative to the top of the container;
    (h) a plurality of angled guides fixed to the spreader about its rectangular edge and flaring outwardly and downwardly from the spreader, at least one guide acting to shift the spreader into said proper position as the spreader is lowered toward the rectangular top of the container;
    (i) means for actuating the hydraulic cylinders to lift the spreader and container therewith after locking thereto so that the container may be carried by the vehicle, and
    (j) stop means on the frame for locating the container on the vehicle after it has been lifted for carrying.

References Cited
UNITED STATES PATENTS

| | | | |
|---|---|---|---|
| 3,024,919 | 3/1962 | Willison et al. | 212—14 |
| 3,078,115 | 2/1963 | Harlander et al. | |
| 3,146,903 | 9/1964 | Bjorklund | 214—394 |
| 3,224,613 | 12/1965 | Bowman-Shaw | 214—396 |
| 3,344,940 | 10/1967 | Burgess et al. | 214—394 |

ALBERT J. MAKAY, Primary Examiner

U.S. Cl. X.R.

294—67